United States Patent [19]

Ikeda et al.

[11] Patent Number: 6,022,907
[45] Date of Patent: Feb. 8, 2000

[54] URETHANE PREPOLYMER, PROCESS FOR PRODUCING THE SAME AND PRESSURE-SENSITIVE ADHESIVE COMPRISING THE SAME

[75] Inventors: Junichi Ikeda, Nara; Katsuya Kume, Osaka, both of Japan

[73] Assignees: Kyoeisha Chemical Co., Ltd.; Nitto Denko Corporation, both of Osaka, Japan

[21] Appl. No.: 09/084,990

[22] Filed: May 28, 1998

[30] Foreign Application Priority Data

Jun. 3, 1997 [JP] Japan ................................. 9-145139

[51] Int. Cl.⁷ .................................................. C08G 18/62
[52] U.S. Cl. .......................... 522/90; 528/49; 528/74.5; 528/75; 528/83; 528/297; 522/33; 525/438; 525/440; 526/227; 526/301; 526/302
[58] Field of Search .............................. 528/74.5, 83, 49, 528/75, 297; 522/90, 33; 526/301, 302, 227; 525/440, 438

[56] References Cited

U.S. PATENT DOCUMENTS

| | | | |
|---|---|---|---|
| 4,164,486 | 8/1979 | Kudo et al. | 204/159.19 |
| 4,820,745 | 4/1989 | Müller et al. | 522/90 |
| 5,087,686 | 2/1992 | Ansell et al. | 528/49 |

FOREIGN PATENT DOCUMENTS 0 305 175   3/1989   European Pat. Off. .
0 539 030   4/1993   European Pat. Off. .

*Primary Examiner*—Rachel Gorr
*Attorney, Agent, or Firm*—Sughrue, Mion, Zinn, Macpeak & Seas, PLLC

[57] ABSTRACT

Novel urethane prepolymers which can be applied onto substrates without using any solvent, processes for producing the same, and pressure-sensitive adhesives using the prepolymers, which are excellent in adhesive strength, holding power and low temperature properties are provided. The urethane prepolymer is represented by the following formula [I] or [II]:

$$d\text{-}c\text{-}(a\text{-}c)_k\text{-}e \qquad [\text{I}]$$

or $$d\text{-}c\text{-}(a\text{-}c)_n\text{-}(b\text{-}c)_m\text{-}(a\text{-}c)_l\text{-}e \qquad [\text{II}]$$

wherein k is from 4 to 100; n and l each are from 2 to 50; m is from 1 to 50; a represents a polyester group having a number average molecular weight of $1 \times 10^3$ to $5 \times 10^3$; b represents a divalent group; c represents an organic isocyanate group; d represents a monool having functional groups; and e is a monool, which is the same as or different from d, having a number average molecular weight of $5 \times 10^3$ to $5 \times 10^5$. Such an urethane prepolymer is crosslinked to increase its molecular weight, thereby providing a pressure-sensitive adhesive.

19 Claims, No Drawings

URETHANE PREPOLYMER, PROCESS FOR PRODUCING THE SAME AND PRESSURE-SENSITIVE ADHESIVE COMPRISING THE SAME

FIELD OF THE INVENTION

The present invention relates to an urethane prepolymer which is crosslinked with an active energy ray to exert a pressure-sensitive adhesive properties, a process for producing the urethane prepolymer, and a pressure-sensitive adhesive comprising the urethane prepolymer.

BACKGROUND OF THE INVENTION

Pressure-sensitive adhesives constitute, for example, an adhesive face of a pressure-sensitive adhesive tape, and comprises acrylic or rubber polymers having a high molecular weight of, for example, several ten thousands to several millions. These polymers are dissolved in solvents and, after optionally adding other components such as tackifiers, applied onto substrates made of, for example, vinyl tapes. After completion of the application, the solvents are evaporated to remain the polymers. The polymers thus remained are dried to thereby obtain a pressure-sensitive adhesive face having a tackiness. In the production of those pressure-sensitive adhesives, there arises a problem that the solvents needed for the dissolution of the polymers scatter in a large amount into the atmosphere during the application step. Therefore, it has been required to use an apparatus for recovering the solvents scattered.

On the other hand, investigations have been made to use crosslinkable urethane resins as a pressure-sensitive adhesive which can apply components of pressure-sensitive adhesives onto substrates without using solvents.

However, any of the conventional pressure-sensitive adhesives using crosslinkable urethane resins have not been provided with fundamental properties required as pressure-sensitive adhesives in good balance.

SUMMARY OF THE INVENTION

Accordingly, the present invention has been made to overcome the above-described disadvantages.

One object of the present invention is to provide novel urethane prepolymers which can apply onto a substrate without using a solvent.

Another object of the present invention is to provide processes for producing the urethane prepolymers.

Further object of the present invention is to provide pressure-sensitive adhesives comprising the urethane prepolymers, which has adhesive strength and holding power in good balance and can exert sufficient pressure-sensitive adhesive properties even in low temperature region.

The urethane prepolymer according to one embodiment of the present invention, developed to achieve the above-described object is represented by the following formula [I]:

$$\text{d-c-(a-c)}_k\text{-e} \qquad [I]$$

wherein k is from 4 to 100; a represents a polyester group having a number average molecular weight of $1 \times 10^3$ to $5 \times 10^3$; c represents an organic isocyanate group; d represents a monool having at least one functional group selected from the group consisting of hydroxyl group, carboxyl group, (meth)acryloyl group and vinyl group; and e is a monool, which is the same as or different from d, having a number average molecular weight of $5 \times 10^3$ to $5 \times 10^5$.

The urethane prepolymer according to another embodiment of the present invention, developed to achieve the above-described object is represented by the following formula [II]:

$$\text{d-c-(a-c)}_n\text{-(b-c)}_m\text{-(a-c)}_l\text{-e} \qquad [II]$$

wherein n and l each are from 2 to 50; m is from 1 to 50; a represents a polyester group having a number average molecular weight of $1 \times 10^3$ to $5 \times 10^3$; b represents at least one divalent group selected from the group consisting of dimaines and diols; c represents an organic isocyanate group; d represents a monool having at least one functional group selected from the group consisiting of hydroxyl group, carboxyl group, (meth)acryloyl group and vinyl group; and e is a monool, which is the same as or different from d, having a number average molecular weight of $5 \times 10^3$ to $5 \times 10^5$.

The process for producing the urethane prepolymer according to one embodiment of the present invention, developed to achieve the above-described object comprises forming a prepolymer comprising a repeating unit formed by polyaddition reaction of the polyester group a and the organic isocyanate group c and having organic isocyanate groups c at both ends thereof; and adding the monool d having at least one functional group selected from the group consisting of hydroxyl group, carboxyl group, (meth) acryloyl group and vinyl group to the organic isocyanate group at one end of the prepolymer, and another monool e, which is the same as or different from the monool d, to the organic isocyanate group at another end of the prepolymer, thereby forming the urethane prepolymer represented by the above formula [I].

The process for producing the urethane prepolymer according to another embodiment of the present invention, developed to achieve the above-described object comprises adding a repeating unit formed by polyaddition reaction of the polyester group a and the organic isocyanate group c to both ends of another repeating unit formed by polyaddition reaction of the organic isocyanate group c and the group b selected from the group consisting of diamines and diols, to thereby form a polymer having the organic isocyanate groups c at both ends thereof; and adding the monool d having at least one functional group selected from the group consisting of hydroxyl group, carboxyl group, (meth) acryloyl group and vinyl group to the organic isocyanate group at one end of the polymer, and another monool e, which is the same as or different from the monool d, to the organic isocyanate group at another end of the polymer, to thereby obtain the urethane prepolymer represented by the above formula [II].

The pressure-sensitive adhesive of the present invention, developed to achieve the above-described object comprises, as a main component, a polymer prepared by crosslinking the urethane prepolymer represented by the above formula [I] or [II], thereby increasing its molecular weight.

DETAILED DESCRIPTION OF THE INVENTION

It is preferable that the polyester group having a number average molecular weight of $1 \times 10^3$ to $5 \times 10^3$ as component a is at least one member selected from the group consisting of groups represented by the following formulae:

$$-[OC_{34}H_{66}COORO]_j-$$

and $$-[OC_{34}H_{68}COORO]_i-$$

wherein R represents an alkylene group having 2 to 36 carbon atoms; and j is an integer determined by the number average molecular weight of the polyester group.

It is preferable that the organic isocyanate group of compoenent c is at least one member selected from the group consisting of isophorone diisocyanate group, hexamethylene diisocyanate group, norbornane diisocyanate group, tolylene diisocyanate group, xylylene diisocyanate group, trimethylhexamethylene diisocyanate group, hydrogenated xylylene diisocyanate group, hydrogenated diphenylmethane diisocyanate group and diphenylmethane diisocyanate group.

It is preferable that the monool of compoenent d is at least one member selected from the group consisting of hydroxyalkyl (meth)acrylates, hydroxyalkyl vinyl ethers, carboxyl group-containing monoalcohols, lauryl alcohol and isooctanol.

It is preferable that the monool of component e is at least one member selected from the group consisting of hydroxyalkyl (meth)acrylates, hydroxyalkyl vinyl ethers, carboxyl group-containing monoalcohols, lauryl alcohol, isooctanol, straight-chain alkyl alcohols represented by the formula $C_qH_{2q+1}OH$ (wherein q is from 1 to 18), $_m$isoalkyl alcohols, secondary alkyl alcohols, tertiary alkyl alcohols, and hydroxyl group-containing phenylketones, such as 1-hydroxycyclohexylphenyl ketone and 4-(2-hydroxyethoxy)phenyl-(2-hydroxy-2-propyl) ketone.

It is preferable that the diamine of componenet b is at least one member selected from the group consisting of diaminopropane, diaminobutane, nonanediamine, isophoronediamine, hexamethylenediamine, hydrogenated diphenylmethanediamine, bisaminopropyl ether, bisaminopropylethane, bisaminopropyl diet.hylene glycol ether, bisaminopropyl polyethyleneglycol ether, bisaminopropoxyneopentyl glycol, diphenylmethanediamine, xylylenediamine, toluenediamine and both end-amino-modified silicone.

It is preferable that the diol of component b is at least one member selected from the group consisting of ethylene glycol, polyethylene glycol, propylene glycol, polypropylene glycol, butylene glycol, polytetramethylene glycol, pentanediol, hexanediol, both end-hydroxyl-modified silicone and carboxyl group-ccntaining diols.

The urethane prepolymer represented by the above formula [I] or [II] is crosslinked in the presence of at least one member selected from the group consisting of crosslinking agents, polymerization initiators and active energy.

The active energy includes ultraviolet light, visible light and heat.

Where the monools d and/or e in the urethane prepolymers of the above formula [I] or [II] are hydroxyalkyl (meth)acrylates, it is preferable that the crosslinking is performed under irradiation with light in the presence of a photoradical polymerization initiator. Example of the photoradical polymerization initiator include hydroxycyclohexylphenyl ketone, 1-phenyl-2-hydroxy-2-methylpropan-1-one, 2,2-dimethoxy-2-phenylacetophenone, benzophenone, 2-methyl[4-(methylthio)phenyl]-2-morpholino-1-propanone, 2-hydroxy-2-methyl-1-phenylpropan-1-one, 1-(4-isopropylphenyl)-2-hydroxy-2-methylpropan-1-one, 4-(2-hydroxyethoxy)phenyl-(2-hydroxy-2-propyl)ketone, 4-(2-acryloyloxyethoxy)phenyl-(2-hydroxy-2-propyl)ketone,4-(2-methacryloyloxyethoxy)phenyl-(2-hydroxy-2-propyl)ketone and 2,4,6-trimethylbenzoyldiphenylphosphine oxide.

Alternatively, the crosslinking may be performed under heating in the presence of a heat polymerization initiator, for example, dilauroyl peroxide, dibutyl peroxide, dicumyl peroxide, t-butylcumyl peroxide, α,α-bis (t-butylperoxy-m-isopropyl)benzoate or 2,5-dimethyl-2,5-di(t-butylperoxy)-hexane, as a polymerization initiator. Thus, the (meth)-acryloyl groups undergo polymerization, causing crosslinking and increasing the molecular weight. As a result, a material appropriate as pressure-sensitive adhesives is formed.

Where the monools d and/or e in the urethane prepolymer are hydroxyalkyl vinyl ethers, it is preferable that the crosslinking is effected under light irradiation in the presence of a radiation induced cationic polymerization initiator, such as aromatic sulfonium salts, p-hydroxyphenyl benzylmethylsulfonium salt or p-methoxycarbonyloxyphenyl dimethylsulfonium salt, as a polymerization initiator. Thus, the vinyl groups or epoxy groups undergo polymerization, causing crosslinking and increasing the molecular weight.

Where the monools d and/or e in the urethane prepolymer are carboxyl group-containing monoalcohols or the group b is a carboxyl group-containing diol such as dimethylolpropionic acid ($HOCH_2CH(COOH)CH_2OH$), the crosslinking is performed using an epoxy compound as a crosslinking agent. Examples of the epoxy compound are bisphenol A-diglycidyl ether, hydrogenated bisphenol A-diglycidyl ether, bisphenol F-diglycidyl ether, hydrogenated bisphenol F-diglycidyl ether, bisphenol S-diglycidyl ether, hydrogenated bisphenol S-diglycidyl ether, phthalic acid-diglycidyl ether, hydrogenated phthalic acid-diglycidyl ether, ethylene glycol-diglycidyl ether, diethylene glycol-diglycidyl ether, triethylene glycol-diglycidyl ether, tetraethylene glycol--diglycidyl ether, polyethylene glycol-diglycidyl ether, propylene glycol-diglycidyl ether, dipropylene glycol-diglycidyl ether, tripropylene glycol-diglycidyl ether, polypropylene glycol-diglycidyl ether, butanediol diglycidyl ether, polytetramethylene glycol-diglycidyl ether, hexanediol diglycidyl ether, nonanediol diglycidyl ether, phenol novolak epoxide and cresol novolak epoxide. This epoxycrosslinking may be carried out by adding dimethylbenzylamine as a catalyst, and heating.

Where the group b in the urethane prepolymer of the formula [II] is diamines, the crosslinking is performed by adding as a crosslinking agent a polyisocyanate such as hexamethylene diisocyanate trimer, isophorone diisocyanate trimer or crude MDI (diphenylmethane diisocyanate), and heating. Thus, the diamine b reacts with the isocyanate group —NCO to thereby form a secondary amine —NH— followed by crosslinking and polymerization.

The urethane prepolymers of the present invention are practically produced by the following methods.

A polyester polyol having the above-described polyester group a can be obtained by, for example, mixing a dimer acid with 1,6-hexanediol, linear $HOOC-(CH_2)_{34}-COOH$ with a dimer diol, or a dimer acid with a dimer diol, followed by esterif ication.

7 mol of the polyester polyol thus obtained is then mixed with 8 mol of an organic isocyanate. After optionally adding an antioxidant such as di-t-butyl-hydroxyphenol and/or a catalyst such as dibutyltin dilaurylate, the resulting mixture is heated to 80 to 100° C. for 3 hours or longer. After cooling, 1 mol of the monool d having a functional group and 1 mol of the monool e are further added and the resulting mixture is heated to 80 to 85° C. for 4 hours or longer. Completion of the reaction is confirmed by the disappearance of a peak at 2,280 $cm^{-1}$ assignable to the isocyanate group in the infrared absorption spectrum. Thus, an urethane prepolymer is synthesized.

This urethane prepolymer is a viscous liquid having a number average molecular weight of $5×10^3$ to $5×10^5$, and can be applied to substrates or subjects as it is. The urethane prepolymer is then crosslinked using appropriate crosslinking agents, polymerization initiators, polymerization catalysts and active energy, which are selected depending on the functional groups in the urethane prepolymer, to increase the molecular weight, making the prepolymer in a semi-cured state. The prepolymer thus obtained exhibits pressure-sensitive adhesive properties, and a pressure-sensitive adhesive is obtained.

The present invention will now be described in more detail by reference to the following examples, but it should be understood that the invention is not construed as being limited thereto.

In each of Examples 1 to 14, a pressure-sensitive adhesive of the present invention was produced from an urethane prepolymer of the present invention produced by the process according to the present invention, and the performances of the pressure-sensitive adhesive were evaluated. On the other hand, Comparative Example shows an embodiment outside the scope of the present invention.

EXAMPLE 1

156.1 g of a polyester polyol (hydroxyl value: 53.3, number average molecular weight: 2,100), which had been obtained by esterifying a highly pure hydrogenated dimer acid having 36 carbon atoms with 1,6-hexanediol, 21.9 g of isophorone diisocyanate (IPDI), 0.03 g of di-t-butyl-hydroxyphenol (BHT) as an antioxidant and 0.02 g of dibutyltin dilaurylate (DBTL) were fed into a 1 liter four-necked flask equipped with a stirrer, a condenser and a thermometer, and the resulting mixture was reacted at 100° C. for 4 hours. After cooling the reaction mixture to 80° C., 2.9 g of 2-hydroxyethyl acrylate (2-HEA), 6.1 g of lauryl alcohol and 0.0374 g of p-methoxyphenol as a heat polymerization inhibitor were added thereto, and the resulting mixture was reacted at 85° C. for 5 hours. Completion of the reaction was confirmed by the disappearance of a peak at 2,280 cm$^{-1}$ assignable to the isocyanate group in the infrared absorption spectrum. Thus a liquid urethane prepolymer was obtained.

When a number average molecular weight of this prepoymer was determined using gel-packed liquid chromatography (GPC) ("GPC-1" manufactured by Showa Denko K.K.), it was found to be $0.9 \times 10^4$ g, calculated as a polystyrene basis.

To 97 g of the urethane prepolymer obtained above was added 3.0 g of 1-phenyl-2-hydroxy-2-methylpropan-1-one (HMPP; "IRGACURE #1173", trade name) as a photopolymerization initiator. After thoroughly mixing, the resulting mixture was applied onto a polyethylene terephthalate film having a thickness of 25 µm as a substrate film at a coating build-up of 30 µm. The coated surface of the substrate film was covered with a polyethylene terephthalate film having a thickness of 50 µm as a release film. The composite material thus formed was put on a conveyer driven at a speed of 6 m/min and irradiated with a high-pressure mercury lamp (80 W/cm) located 10 cm above to thereby perform crosslinking the mixture, resulting in increase of the molecular weight thereof. Thus the mixture was semi-cured and showed pressure-sensitive adhesive properties. As a result, an adhesive tape composed of the substrate film, the pressure-sensitive adhesive layer formed thereon and the release film covering the pressure-sensitive adhesive layer was obtained.

A glass transition temperature of the pressure-sensitive adhesive Layer was measured with a differential scanning calorimetry (DSC), and it was found to be −43.7° C. The pressure-sensitive adhesive tape thus obtained was evaluated on an adhesive strength and a holding power of adhesiveness. To evaluate the adhesive strength, a peeling test was carried out three times in accordance with JIS Z 0237 and the mean value was determined. To evaluate the holding power, a dropping test was carried out similarly in accordance with JIS Z 0237. In this test, the time until dropping a weight was measured three times and the mean value was determined. Moreover, the ball No. was measured in accordance with JIS Z 0237. As a result, the pressure-sensitive adhesive showed an adhesive strength of 915 g/25 mm, a holding power of 1,000 min. at 40° C. and a ball No. of 10.

EXAMPLE 2

315.8 g of a polyester polyol (hydroxyl value: 53.1, number average molecular weight: 2,100), which had been obtained by esterifying a highly pure hydrogenated dimer acid with 1,6-hexanediol, 44.4 g of IPDI, 0.075 g of BHT and 0.04 g of DBTL were fed into a 1 liter four-necked flask equipped with a stirrer, a condenser and a thermometer, and the resulting mixture was reacted at 100° C. for 4 hours. After cooling the reaction mixture to 80° C., 5.8 g of 2-HEA, 6.8 g of isooctanol and 0.075 g of p-methoxyphenol were added thereto and the resulting mixture was reacted at 85° C. for 5 hours to thereby obtain a liquid urethane prepolymer. Using this liquid urethane prepolymer, a pressure-sensitive adhesive tape was obtained in the same manner as in Example 1. The adhesive tape was also evaluated in the same manners as in Example 1. The results obtained are shown in the Table below.

EXAMPLE 3

182.4 g of the same polyester polyol as obtained in Example 1, 22.2 g of IPDI, 0.0374 g of BHT and 0.02 g of DBTL were fed into a 1 liter four-necked flask equipped with a stirrer, a condenser and a thermometer, and the resulting mixture was reacted at 100° C. for 4 hours. After cooling the reaction mixture to 80° C., 2.9 g of 2-HEA and 0.0374 g of p-methoxyphenol were added thereto and the resulting mixture was reacted at 85° C. for 5 hours to thereby obtain a liquid urethane prepolymer. Using this liquid urethane prepolymer, a pressure-sensitive adhesive tape was obtained in the same manner as in Example 1. The adhesive tape thus obtained was also evaluated in the same manners as in Example 1. The results obtained are shown in the Table below.

EXAMPLE 4

A liquid urethane prepolymer was obtained in the same manner as in Example 1 except for using 4.3 g of 2-HEA and replacing the lauryl alcohol with 1.7 g of isooctanol. Using this liquid urethane prepolymer, a pressure-sensitive adhesive tape was obtained in the same manner as in Example 1. The adhesive tape thus obtained was also evaluated in the same manners as in Example 1. The results obtained are shown in the Table below.

EXAMPLE 5

282.5 g of the same polyester polyol as obtained in Example 1, 11.1 g of IPDI, 41.7 g of hexamethylene diisocyanate trimer, 0.068 g of BHT and 0.02 g of DBTL were fed into a 1 liter four-necked flask equipped with a stirrer, a condenser and a thermometer, and the resulting was reacted at 100° C. for 4 hours. After cooling the reaction mixture to 80° C., 1.4 g of 2-HEA, 5.2 g of isooctanol and 0.068 g of p-methoxyphenol were added thereto and the resulting mixture was reacted at 85° C. for 5 hours to thereby obtain a liquid urethane prepolymer. Using this liquid urethane prepolymer, a pressure-sensitive adhesive tape was obtained in the same manner as in Example 1. The adhesive tape thus obtained was also evaluated in the same manners as in Example 1. The results obtained are shown in the Table below.

EXAMPLE 6

182.4 g of the same polyester polyol as obtained in Example 1, 22.2 g of IPDI, 0.0374 g of BHT and 0.02 g of DBTL were fed into a 1 liter four-necked flask equipped with a stirrer, a condenser and a thermometer, and the resulting mixture was reacted at 100° C. for 4 hours. After cooling the reaction mixture to 80° C., 1.45 g of 2-HEA, 1.6 g of isooctanol and 0.0374 g of p-methoxyphenol were added thereto and the resulting mixture was reacted at 85° C. for 5 hours to thereby obtain a liquid urethane prepolymer. Using this liquid urethane prepolymer, a pressure-sensitive adhesive tape was obtained in the same manner as in Example 1. The adhesive tape thus obtained was also evaluated in the same manners as in Example 1. The results obtained are shown in the Table below.

EXAMPLE 7

A liquid urethane prepolymer was obtained in the same manner as in Example 1 except for replacing the IPDI with 26.2 g of hydrogenated MDI. Using this liquid urethane prepolymer, a pressure-sensitive adhesive tape was obtained in the same manner as in Example 1. The adhesive tape thus obtained was also evaluated in the same manners as in Example 1. The results obtained are shown in the Table below.

EXAMPLE 8

156.1 g of the same polyester polyol as obtained in Example 1, 21.9 g of IPDI, 0.0374 g of BHT and 0.02 g of DBTL were fed into a 1 liter four-necked flask equipped with a stirrer, a condenser and a thermometer, and the resulting mixture was reacted at 100° C. for 4 hours. After cooling the reaction mixture to 80° C., 1.45 g of 2-HEA and 1.6 g of isooctanol were added thereto and the resulting mixture was reacted at 85° C. for 5 hours. The reaction mixture was cooled to 50° C., and 1.1 g of isophoronediamine was added thereto to thereby extend the polymer chain. Thus, a liquid urethane prepolymer was obtained. Using this liquid urethane prepolymer, a pressure-sensitive adhesive tape was obtained in the same manner as in Example 1. The adhesive tape thus obtained was also evaluated in the same manners as in Example 1. The results obtained are shown in the Table below.

EXAMPLE 9

A liquid urethane prepolymer was obtained in the same manner as in Example El except for replacing the isooctanol (1.6 g) by 3.9 g of 12-hydroxystearic acid and introducing a COOH group into the end. Using this liquid urethane prepolymer, a pressure-sensitive adhesive tape was obtained in the same manner as in Example 1. The adhesive tape thus obtained was evaluated in the same manners as in Example 1. The results obtained are shown in the Table below.

EXAMPLE 10

A liquid urethane prepolymer was obtained in the same manner as in Example 6 except for replacing the polyester polyol used in Example 6 with 136 g of other polyester polyol (hydroxyl value: 57.8, number average molecular weight: $1.9 \times 10^3$) obtained by est-erifying linear HOOC—$(CH_2)_{34}$—COOH (acid value: 196) with a highly pure hydrogenated dimer diol (hydroxyl value: 200 KOH mg/g). Using this liquid urethane prepolymer, a pressure-sensitive adhesive tape was obtained in the same manner as in Example 1. The adhesive tape thus obtained was also evaluated in the same manners as in Example 1. The results obtained are shown in the Table below.

EXAMPLE 11

A liquid urethane prepolymer was obtained in the same manner as in Example 6 except for replacing the polyester polyol used in Example 6 with 137 g of other polyester polyol (hydroxyl value: 57.1), number average molecular weight: $10 \times 10^3$) obtained by esterifying an unhydrogenated highly pure dimer acid (purity: 97% or above, acid value: 196) with a highly pure dimer diol (hydroxyl value: 200 KOH mg/g). Using this liquid urethane prepolymer, a pressure-sensitive adhesive tape was obtained in the same manner as in Example 1. The adhesive tape thus obtained was evaluated in the same manners as in Example 1. The results obtained are shown in the Table below.

EXAMPLE 12

221 g of the same polyester polyol as obtained in Example 1, 24.5 g of IPDI, 0.05 g of BHT and 0.03 g of DBTL were fed into a 1 liter four-necked flask equipped with a stirrer, a condenser and a thermometer, and the resulting mixture was reacted at 100° C. for 4 hours. After cooling the reaction mixture to 80° C., 3.2 g of isophoronediamine was added thereto and the resulting mixture was reacted for 1 hour. Further, 0.014 g of isooctanol was added thereto. After 1 hour, completion of the reaction was confirmed by the disappearance of the isocyanate group ($2{,}280$ cm$^{-1}$) to thereby obtain a liquid urethane prepolymer.

To 100 g of the urethane prepolymer thus obtained was added 1.0 g of hexamethylene diisocyanate trimer. The mixture thus obtained was applied onto a polyethylene terephthalate film at a coating build-up of 30 μm, and then crosslinked by heating to 100° C. for 20 minutes to thereby obtain a pressure-sensitive adhesive tape. The adhesive tape thus obtained was then evaluated in the same manners as in Example 1. The results obtained are shown in the Table below.

EXAMPLE 13

182.4 g of the same polyester polyol as obtained in Example 1, 22.2 g of IPDI, 0.0374 g of BHT and 0.02 g of DBTL were fed into a 1 liter four-necked flask equipped with a stirrer, a condenser and a thermometer, and the resulting mixture was reacted at 100° C. for 4 hours. 7.8 g of 12-hydroxystearic acid was added to the reaction mixture at the same temperature and the resulting mixture was reacted for additional 4 hours to thereby obtain a liquid urethane prepolymer.

To 100 g of the urethane prepolymer thus obtained were added 1.5 g of bisphenol A-diglycidyl ether and 0.3 g of dimethylbenzylamine. After thoroughly mixing, the mixture thus obtained was applied onto a polyethylene terephthalate film at a coating build-up of 30 μm and then crosslinked by heating to 120° C. for 20 minutes to thereby obtain a pressure-sensitive adhesive tape. The adhesive tape thus obtained was then evaluated in the same manners as in Example 1. The results obtained are shown in the Table below.

EXAMPLE 14

182.4 g of the same polyester polyol as obtained in Example 1, 22.2 g of UPDI, 0.0374 g of BHT and 0.02 g of DBTL were fed into a 1 liter four-necked flask equipped with a stirrer, a condenser and a thermometer, and the resulting mixture was reacted at 100° C. for 4 hours. After cooling to 80° C., 1.45 g of 4-hydroxybutyl vinyl ether and 1.6 g of isooctanol were added thereto and the resulting mixture was reacted for additional 5 hours to thereby obtain a liquid urethane prepolymer.

To 100 g of the urethane prepolymer thus obtained were added as a crosslinking agent 3.0 g of $BF_3$ salt of p-hydroxyphenyl benzylmethylsulfonium. After thoroughly mixing, the mixture thus obtained was crosslinked in the same manner as in Example 1 to thereby obtain a pressure-sensitive adhesive tape. The adhesive tape thus obtained was then evaluated in the same manners as in Example 1. The results obtained are shown in the Table below.

COMPARATIVE EXAMPLE

A liquid urethane prepolymer was obtained in the same manner as in Example 1 except for replacing the polyester polyol used in Example 1 with 150 g of terminal hydroxyl-modified polybutadiene (hydroxyl value: 56.1) and using 22.2 g of IPDI. Using this liquid urethane prepolymer, a pressure-sensitive adhesive tape was obtained in the same manner as in Example 1. The adhesive tape thus obtained was then evaluated in the same manners as in Example 1. The results obtained are shown in the Table below.

TABLE

| Ex. No. | Number average molecular weight (g/mol) | Glass transition temperature (°C.) | Adhesive strength (g/25 mm) | Holding power (min. 40° C.) | Ball No. |
|---|---|---|---|---|---|
| 1 | $0.9 \times 10^4$ | -43.7 | 915 | >1,000 | 10 |
| 2 | $1.0 \times 10^4$ | -43.0 | 1,000 | >1,000 | 10 |
| 3 | $1.8 \times 10^4$ | -45.7 | 450 | >1,000 | 10 |
| 4 | $1.4 \times 10^4$ | -42.6 | 120 | >1,000 | 6 |
| 5 | $1.9 \times 10^4$ | -43.4 | 1,000 | >1,000 | 13 |
| 6 | $1.5 \times 10^4$ | -45.4 | 2,350 | >1,000 | 13 |
| 7 | $1.6 \times 10^4$ | -42.1 | 1,440 | >1,000 | 13 |
| 8 | $1.2 \times 10^4$ | -40.0 | 800 | >1,000 | 8 |
| 9 | $1.8 \times 10^4$ | -41.0 | 2,500 | >1,000 | 10 |
| 10 | $1.0 \times 10^4$ | -46.5 | 1,000 | >1,000 | 10 |
| 11 | $1.3 \times 10^4$ | -47.5 | 980 | >1,000 | 10 |
| 12 | $1.8 \times 10^4$ | -45.5 | 1,420 | >1,000 | 11 |
| 13 | $2.0 \times 10^4$ | -44.3 | 1,200 | >1,000 | 12 |
| 14 | $1.5 \times 10^4$ | -47.2 | 1,850 | >1,000 | 10 |
| Comparative Example | $0.9 \times 10^4$ | -53.0 | 70 | Weak, measurement impossible | 5 |

The pressure-sensitive adhesive layers each show a glass transition temperature lower than about -40° C., which indicates that the p:cessure-sensitive adhesive layer does not become brittle even in a considerably low temperature region. The pressure-sensitive adhesives of Examples 1 to 14 of the present invention each show an adhesive strength and holding power sufficiently durable to practical use, and a high ball No., showing a sufficient tackiness. On the other hand, the pressure-sensitive adhesive layer of the Comparative Example shows very low adhesive strength which is not practically used, very weak, measurement-impossible holding power, and very small ball No.

Because of being in the form of a liquid, the urethane prepolymers of the present invention can be applied onto substrates or subjects as it is, and does not require any solvent for coating. Therefore, no solvent scatters during the application step and no apparatus is needed for recovering the solvent. Such urethane prepolymers can be crosslinked in the state of being applied, to increase its molecular weight, thereby exhibiting pressure-sensitive adhesive properties, making it possible to use the same as pressure-sensitive adhesives. Further, those pressure-sensitive adhesives have well-balanced adhesive strength and holding power, and can maintain sufficient pressure-sensitive adhesive properties even in a low temperature region.

While the invention has been described in detail and with reference to specific embodiments thereof, it will be apparent to one skilled in the art that various changes and modifications can be made therein without departing from the spirit and scope thereof.

What is claimed is:

1. A urethane prepolymer represented by the following formula (I):

$$d\text{-}c\text{-}(a\text{-}c)_k\text{-}e$$

wherein k is from 4 to 100; a represents a polyester group having a number average molecular weight of $1 \times 10^3$ to $5 \times 10^3$; c represents an organic isocyanate group; d represents a diol or represents a monool having at least one functional group selected from the group consisting of carboxyl group, (meth)acryloyl group and vinyl group; and e is a monool, which is the same as or different from d, wherein said prepolymer has a number average molecular weight of $5 \times 10^3$ to $5 \times 10^5$; wherein said polyester group having a number average molecular weight of $1 \times 10^3$ to $5 \times 10^3$ is at least one member selected from the group consisting of groups represented by the following formulae:

$$-[OC_{34}H_{66}COORO]_j-$$

and $$-[OC_{34}H_{68}COORO]_j-$$

and wherein R represents an alkyleiie group having 2 to 36 carbon atoms; and j is an integer determined on the basis of said number average molecular weight.

2. A urethane prepolymer represented by the following formula:

$$d\text{-}c\text{-}(a\text{-}c)_n\text{-}(b\text{-}c)_m\text{-}(a\text{-}c)_1\text{-}e \quad \text{(II)}$$

wherein n and 1 each are from 2 to 50; m is from 1 to 50; a represents a polyester group having a number average molecular weight of $1 \times 10^3$ to $5 \times 10^3$; b represents at least one divalent group selected from the group consisting of diamines and diols; c represents an organic isocyanate group; d represents a diol or represents a monool having at least one functional group selected from the group consisting of carboxyl group, (meth) acryloyl group and vinyl group; and e is a monool, which is the same as or different from d, wherein said prepolyner has a number average molecular weight of $5 \times 10^3$ to $5 \times 10^5$;

and wherein said polyester group having a number average molecular weight of $1 \times 10^3$ to $5 \times 10^3$ is at least one member selected from the group consisting of groups represented by the following formulae:

$$-[OC_{34}H_{66}COORO]_j-$$

and

wherein R represents an alkylene group having 2 to 36 carbon atoms; and j is an integer determined on the basis of said number average molecular weight.

3. A urethane prepolymer as claimed in claim 1 or 2, wherein said organic isocyanate group c is at least one member selected from the group consisting of isophorone diisocyanate group, hexamethylene diisocyanate group, norbornane diisocyanate group, tolylene diisocyanate group, xylylene diisocyanate group, trimethylhexamethylene diisocyanate group, hydrogenated xylylene diisocyanate group, hydrogenated diphenylmethane diisocyanate group and diphenylmethane diisocyanate group.

4. A urethane prepolymer as claimed in claim 1 or 2, wherein said monool d is at least member one selected from the group consisting of hydroxyalkyl (meth)acrylates, hydroxyalkyl vinyl ethers and, carboxyl group-containing monoalcohols.

5. A urethane prepolymer as claimed in claim 1 or 2, wherein said monool e is at least one member selected from the group consisting of hydroxyalkyl (meth)acrylates, hydroxyalkyl vinyl ethers, carboy:yl group-containing monoalcohols, lauryl alcohol, isooctanol, linear alkyl alcohols represented by the formula $C_qH_{2q+1}OH$ (wherein q is from 1 to 18), isoalkyl alcohols, secondary alkyl alcohols, tertiary alkyl alcohols and hydroxyl group-containing phenylketones.

6. A urethane prepolymer as claimed in claim 2, wherein said diamine b is at least one member selected from the group consisting of diaminopropane, diaminobutane, nonanediamine, isophoronediamine, hexamethylenediamine, hydrogenated diphenylmethanediamine, bisaminopropyl ether, bisaminopropylethane, bisaminopropyl diethylene glycol ether, bisaminopropyl polyethyleneglycol ether, bisaminopropoxyneopentyl glycol, diphenylmethanediamire, xylylenediamine, toluenediamine and both end-amino-modified silicone, and said diol b is at least one member selected from the group consisting of ethylene glycol, polyethylene glycol, propylene glycol, polypropylene glycol, butylene glycol, polytetramethylene glycol, pentanediol, hexanediol, both end-hydroxyl-modified silicone and carboxyl group-containing diols.

7. A process for producing a urethane prepolymer represented by the following formula (I):

$$d\text{-}c\text{-}(a\text{-}c)_k\text{-}e \qquad (I)$$

wherein k is from 4 to 100; a represents a polyester group having a number average molecular weight of $1\times10^3$ to $5\times10^3$; c represents an organic isocyanate group; d represents a diol or represents a monool having at least one functional group selected from the group consisting of carboxyl group, (meth)acryloyl group and vinyl group; and e represents a monool which is the same as or different from the monool d, which comprises forming a polymer comprising a repeating unit formed by polyaddition reaction of the polyester group a to the organic isocyanate group c and having organic isocyanate groups c at both ends; and adding the diol d or the monool d having at least one functional group selected from the group consisting of carboxyl group, (meth)acryloyl group and vinyl group to the organic isocyanate group at one end of said polymer, and the monool e, which is the same as or different from said monool d, to the organic isocyanate group at another end of said polymer;

wherein said polyester group is at least one member selected from the group consisting of groups represented by the following forrmvulae:

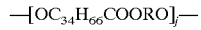

and

wherein R represents an alkylene group having 2 to 36 carbon atoms; and j is an integer determined on the basis of said number average molecular weight.

8. A process for producing a urethane prepolymer represented by the following formula (II):

$$d\text{-}c\text{-}(a\text{-}c)_n\text{-}(b\text{-}c)_m\text{-}(a\text{-}c)_1\text{-}e \qquad (I)$$

wherein n and 1 each are from 2 to 50; and m is from 1 to 50; a represents a polyester group having a number average molecular weight of $1\times10^3$ to $1\times10^5$; b represents at least one group selected from the group consisting of diamines and diols; c represents an organic isocyanate group; d represents a diol or represents a monool having at least one functional group selected from the group consisting of carboxyl group, (meth) acryloyl group and vinyl group; and e represents a monool which is the same as or different from the monool d, which comprises adding repeating units formed by polyaddition reaction of the polyester group a to the organic isocyanate group c, to both ends of another repeating unit formed by polyaddition reaction of the organic isocyanate group c to the group b of at least one member selected from the group consisting of diamincs and diols to thereby form a polymer having the organic isocyanate groups c at both ends; and adding the diol d or the monool d having at least one functional group selected from the group consisting of carboxyl group, (meth)acryloyl group and vinyl group to the organic isocyanate group at one end of said polymer, and the monool e, which is the same as or different from said monool d, to the organic isocyanate group at another end of said polymer;

wherein said polyester group is at least one member selected from the group consisting of groups represented bv the following formulae:

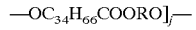

and

wherein R represents an alkylerie group having 2 to 36 carbon atoms; and j is an integer determined on the basis of said number average molecular weight.

9. A process for producing a urethane prepolymer as claimed in claim 7 or 8, wherein said organic isocyanate group c is at least one member selected from the group consisting of isophorone diisocyana-te group, hexamethylene diisocyanate group, norbornane diisocyanate group, tolylene diisocyanate group, xylylene diisocyanate group, trimethylhexamethylene diisocyanate group, hydrogenated xylylene diisocyanate group, hydrogenated diphe:riylmethane diisocyanate group and diphenylmethane diisocyanate group.

10. A process for producing a urethane prepolymer as claimed in claim 7 or 8, wherein said monool d is at least one member selected from the group consisting of hydroxyalkyl (meth)acrylates, hydroxyalkyl vinyl ethers and, carboxyl group-containing monoalcohols.

11. A process for producing a urethane prepolymer as claimed in claim 7 or 8, wherein said monool e is at least one member selected from the group consisting of hydroxyalkyl (meth)acrylates, hydroxyalkyl vinyl ethers, carboxyl group-containing monoalcohols, lauryl alcohol, isooctanol, linear alkyl alcohols represented by the formula $C_qH_{2q+1}OH$ (wherein q is from 1 to 18), isoalkcyl alcohols, secondary alkyl alcohols, tertiary alkyl alcoho:Ls and hydroxylated phenylketones.

12. A process for producing a urethane prepolymer as claimed in claim 8, wherein said diamine b is at least one member selected from the group consisting of diaminopropane, diaminobutane, nonanediamine, isophoronediamine, hexamethylenediamine, hydrogenated diphenylmethanediamine, bisaminopropyl ether, bisaminopropylethane, bisaminopropyl diethylene glycol ether, bisaminopropyl polyethyleneglycol ether, bisaminopropoxyneopentyl glycol, diphenylmethanediamine, xylylenediamine, toluenediamine and both end-amino-modified silicone, and said diol b is at least one member selected from the group consisting of ethylene glycol, polyethylene glycol, propylene glycol, polypropylene glycol, butylene glycol, polytetramethylene glycol, pentanediol, hexanediol, both endhydroxyl-modified silicone and carboxyl group-containing diols.

13. A pressure-sensitive adhesive comprising as a main component a polymer prepared by crosslinking the urethane prepolymer as claimed in claim 1 or claim 2 to increase its molecular weight.

14. A pressure-sensitive adhesive as claimed in claim 13, wherein said crosslinking of the prepolymer is performed in the presence of at least one member selected from the group consisting of crosslinking agents, polymerization initiators and active energy.

15. A pressure-sensitive adhesive as claimed in claim 14, wherein said active energy is at least one selected from the group consisting of ultraviolet rays, visible rays and heat.

16. A pressure-sensitive adhesive as claimed in claim 14, wherein at least. one of the monools d and e in said urethane prepolymer is a hydroxyalkyl (meth)acrylate, and said polymerization initiator is at least one photoradical polymerization initiator selected from the group consisting of hydroxycyclohexylphenryl ketone, 1-phenyl-2-hydroxy-2-methylpropan-1-one, 2,2-dimethoxy-2-phenylacetophenone, benzophenone, 2-methyl[4-(methylthio)phenyl]-2-morpholino-1-propanone, 2-hydroxy-2-methyl-1-phenylpropan-1-one, 1-(4-isopropylphenyl)-2-hydroxy-2-methylpropan-1-one, 4-(2-hydroxyethoxy)phenyl-(2-hydroxy-2-propyl)ketone, 4-(2-acryloyloxyethoxy)phenyl-(2-hydroxy-2-propyl)ketone, 4-(2-methacryloyloxyethoxy)phenyl-(2-hydroxy-2-propyl) ketone and 2,4,6-trimethylbenzoyldiphenylphosphine oxide, or at least one heat polymerization initiator selected from the group consisting of dilauroyl peroxide, dibutyl peroxide, dicumyl peroxide, t-butylcurnyl peroxide, α,α-bis (t-butylperoxy-m-isopropyl)benzoate and 2,5-dimethyl-2,5-di (t-butylperoxy)-hexane.

17. A pressure-sensitive adhesive as claimed in claim 14, wherein at least: one of said monools d and e in said urethane prepolymer is a hydroxyalkyl vinyl ether, and said polymerization initiator is at least one radiation induced cationic polymerization initiator selected from the group consisting of aromatic sulfonium salts, p-hydroxyphenyl benzylmethylsulfonium salt and p-methoxycarbonyloxyphenyl dimethylsulfonium salt.

18. A pressure-sensitive adhesive as claimed in claim 14, wherein at least one of said monools d and e in said urethane prepolymer is a carboxy group-containing monoalcohol or said b in said urethane prepolvmer represented by formula (II) is a carboxylated diol, and said crosslinking agent is at least one epoxy compound selected from the group consisting of bisphenol A-diglycidyl ether, hydrogenated bisphenol A-diglycidyl ether, bisphenol F-diglycidyl ether, hydrogenated bisphenol F-diglycidyl ether, bisphenol S-diglycidyl ether, hydrogenated bisphenol S-diglycidyl ether, phthalic acid-diglycidyl ether, hydrogenated phthalic acid-diglycidyl ether, ethylene glycol-diglycidyl ether, diethylene glycol-diglycidyl ether, triethylene glycol-diglycidyl ether, tetraethylene glycol-diglycidyl ether, polyethylene glycoldiglycidyl ether, propylene glycol-diglycidyl ether, dipropylene glycol-diglycidyl ether, tripropylene glycol-diglycidyl ether, polypropylene glycol-diglycidyl ether, butanediol diglycidyl ether, polytetraethylene glycol diglycidyl ether, hexanediol diglycidyl ether, nonanediol diglycidyl ether, phenol novolak epoxide and cresol novolak expoxide.

19. A pressure-sensitive adhesive as claimed in claim 14, wherein said urethane prepolymer is represented by formula (II) wherein said b is a diamine, and said crosslinking agent is polyisocyanate.

\* \* \* \* \*